(12) United States Patent
Tabellini et al.

(10) Patent No.: US 7,971,924 B2
(45) Date of Patent: Jul. 5, 2011

(54) GANGWAY BELLOWS COVER-STYLE CONNECTING DEVICE FOR ARTICULATED VEHICLES

(75) Inventors: Giorgio Tabellini, Sasso Marconi (IT); Luca Guidi, Bologna (IT); Denis Browne, Trittau (DE)

(73) Assignee: P.E.I. Protezioni Elaborazioni Industriali S.R.L. (IT)

( * ) Notice: Subject to any disclaimer, the term of this patent is extended or adjusted under 35 U.S.C. 154(b) by 0 days.

(21) Appl. No.: 12/510,730

(22) Filed: Jul. 28, 2009

(65) Prior Publication Data

US 2010/0025962 A1   Feb. 4, 2010

(30) Foreign Application Priority Data

Jul. 31, 2008 (IT) ................ B02008A0483

(51) Int. Cl.
*B60N 3/00* (2006.01)
*B61D 7/22* (2006.01)
(52) U.S. Cl. ........................ 296/178; 105/20
(58) Field of Classification Search .............. 296/178; 105/20
See application file for complete search history.

(56) References Cited

U.S. PATENT DOCUMENTS

| | | | | |
|---|---|---|---|---|
| 5,456,186 A | * | 10/1995 | Hubner | 105/18 |
| 5,546,866 A | * | 8/1996 | Koch | 105/8.1 |
| 7,392,748 B2 | * | 7/2008 | De Antonio et al. | 105/8.1 |
| 7,568,435 B2 | * | 8/2009 | Mosaner | 105/20 |

FOREIGN PATENT DOCUMENTS

| | | |
|---|---|---|
| DE | 3021870 | 12/1981 |
| DE | 3035159 | 4/1982 |
| DE | 9413320 | 11/1994 |
| DE | 20020061 | 3/2001 |
| DE | 10023701 | 11/2001 |
| DE | 10238673 | 12/2003 |
| EP | 0329031 | 8/1989 |
| EP | 0336809 | 10/1989 |
| EP | 1741573 | 1/2007 |
| EP | 1995086 | 11/2008 |

OTHER PUBLICATIONS

European Search Report dated Apr. 24, 2009 from counterpart Italian patent application.
European Search Report dated Oct. 9, 2009 from counterpart European patent application.

\* cited by examiner

*Primary Examiner* — Dennis H Pedder
(74) *Attorney, Agent, or Firm* — Timothy J. Klima; Shuttleworth & Ingersoll, PLC

(57) ABSTRACT

A gangway bellows cover-style connecting device for articulated vehicles comprises a plurality of bands (2) made of flexible material, equipped with stiffening frames (3), connected to each other and forming a tunnel (4) which has an upper wall (6) and two lateral walls (7) for connecting two coaches of a vehicle to each other, and a closing panel (9) connected to a lower portion of the bands (2) for forming a lower wall of the tunnel (4). The connecting device comprises connecting means (10) acting on ends of respective free edges (13, 16) of the closing panel (9) and of the lateral walls (7) of the tunnel (4), in such a way that the closing panel (9) lies coplanar with the free edges (16) of the lateral walls (7) of the tunnel (4).

18 Claims, 4 Drawing Sheets

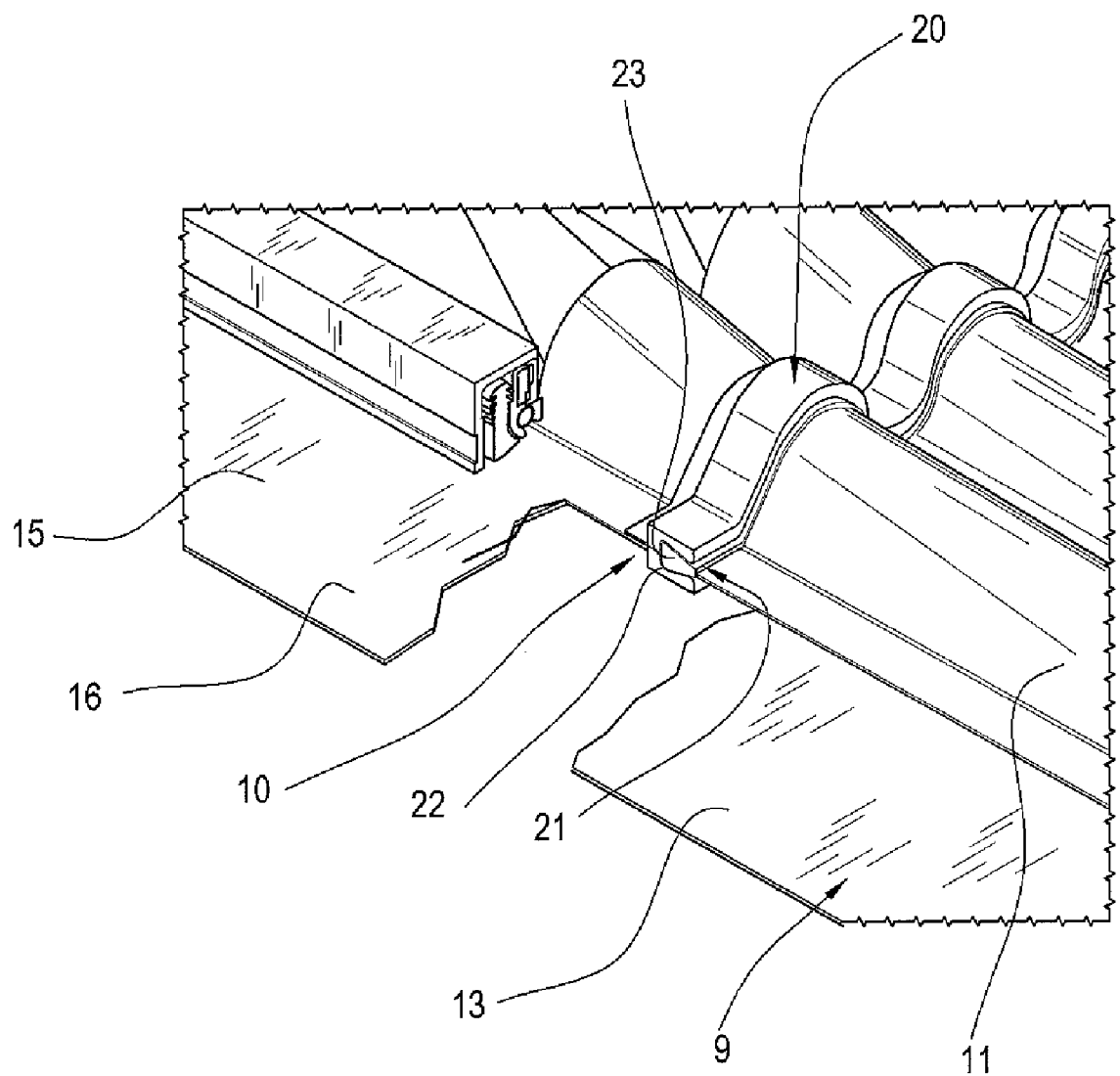

GANGWAY BELLOWS COVER-STYLE CONNECTING DEVICE FOR ARTICULATED VEHICLES

This application claims priority to Italian Patent Application No. BO2008A000483, filed Jul. 31, 2008, which application is incorporated by reference herein.

BACKGROUND OF THE INVENTION

The present invention relates to a gangway bellows cover-style connecting device for articulated vehicles.

In articulated or jointed vehicles, such as city buses, the connection between the two coaches of which the vehicle consists is made by means of rotary platforms able to allow both passenger transit and standing in the connecting zone.

The connection must, necessarily guarantee safety conditions even when the vehicle takes a bend, that is to say, even when the two coaches are not aligned with each other.

There are prior art connecting devices consisting of a substantially U-shaped gangway bellows cover connected to the rotary platform which forms a tunnel for transit between the two coaches.

The ends of the gangway bellows cover are connected to the free ends of the two coaches, in such a way that the gangway bellows cover deforms when the vehicle adopts configurations in which the two coaches are not aligned.

In particular, the gangway bellows cover-style connecting device has an accordion shape, that is to say, it has a plurality of U-shaped bands made of flexible material, usually plasticized fabric, which are joined together longitudinally.

Usually, passing below the rotary platform there are cables and pipes needed for correct operation of the rear/front coach.

The above-mentioned connecting devices therefore also extend below the rotary platform, to offer shelter for and allow correct passage of the above-mentioned cables and pipes.

The prior art also includes closing the U-shaped gangway bellows cover by providing a closing panel connected to the gangway bellows cover and positioned below the rotary platform.

The closing panel is designed to protect the cables and pipes from the outside environment, preventing them from getting damaged.

The closing panel is also designed to act as a shield for the rotary platform, protecting it from the outside environment both to avoid possible damage to it and to lessen the noise from the road surface striking the rotary platform (therefore increasing acoustic comfort for passengers).

In particular, the portion of gangway bellows cover extending below the rotary platform has its free ends folded towards the centre of the vehicle, in such a way as to create two substantially horizontal portions which are opposite each other.

The closing panel is rested on top of the above-mentioned two horizontal portions of the gangway bellows cover and is connected to them by Velcro strips.

The Velcro strips are applied along two opposite outer edges of the panel and on the above-mentioned horizontal portions of the gangway bellows cover.

This type of gangway bellows cover allows the removal of the closing panel for maintenance work on the rotary platform or cables and pipes extending below it, or to allow the latest generation low platform articulated vehicles to avoid positioning the closing panel in contact with the road surface, preventing it from deteriorating.

However, the connecting devices for articulated vehicles briefly described above have several disadvantages.

When the vehicle is taking a bend and the two coaches rotate relative to each other, the portion of gangway bellows cover on the inside of the bend tends to become compacted whilst the portion on the outside of the bend extends.

In this configuration the closing panel also tends to narrow at the portion facing the inside of the bend.

The Velcro strips positioned on the panel in the portion facing the inside of the bend deform, creating undulations to follow the deformation of the panel and the gangway bellows cover.

Those undulations in the Velcro tend to detach the closing panel from the gangway bellows cover, especially if while taking the bend the vehicle encounters irregularities in the road surface which cause stresses in various directions on the gangway bellows cover and on the closing panel.

It should be noticed that, since the closing panel is resting on top of the above-mentioned two horizontal portions of the gangway bellows cover, any mechanical stress to which the gangway bellows cover is subjected is transmitted to the closing panel, contributing to an increase in the tendency of the closing panel to detach when the vehicle takes a bend.

SUMMARY OF THE INVENTION

In this context, the technical purpose which forms the basis of the present invention is to propose a gangway bellows cover-style connecting device for articulated vehicles which overcomes the above-mentioned disadvantages of the prior art.

In particular, the present invention has for an aim to provide a gangway bellows cover-style connecting device for articulated vehicles in which the closing panel cannot disengage from the gangway bellows cover while the vehicle is moving.

The technical purpose indicated and the aims specified are substantially achieved by a gangway bellows cover-style connecting device for articulated vehicles with the technical features described in one or more of the appended claims.

BRIEF DESCRIPTION OF THE DRAWINGS

Further features and advantages of the present invention are more apparent from the non-limiting description which follows of a preferred embodiment of a gangway bellows cover-style connecting device for articulated vehicles, illustrated in the accompanying drawings, in which:

FIG. 4 is a perspective view of an alternative embodiment of a detail of the device of FIG. 1.

DESCRIPTION OF THE PREFERRED EMBODIMENTS

Figure 1:
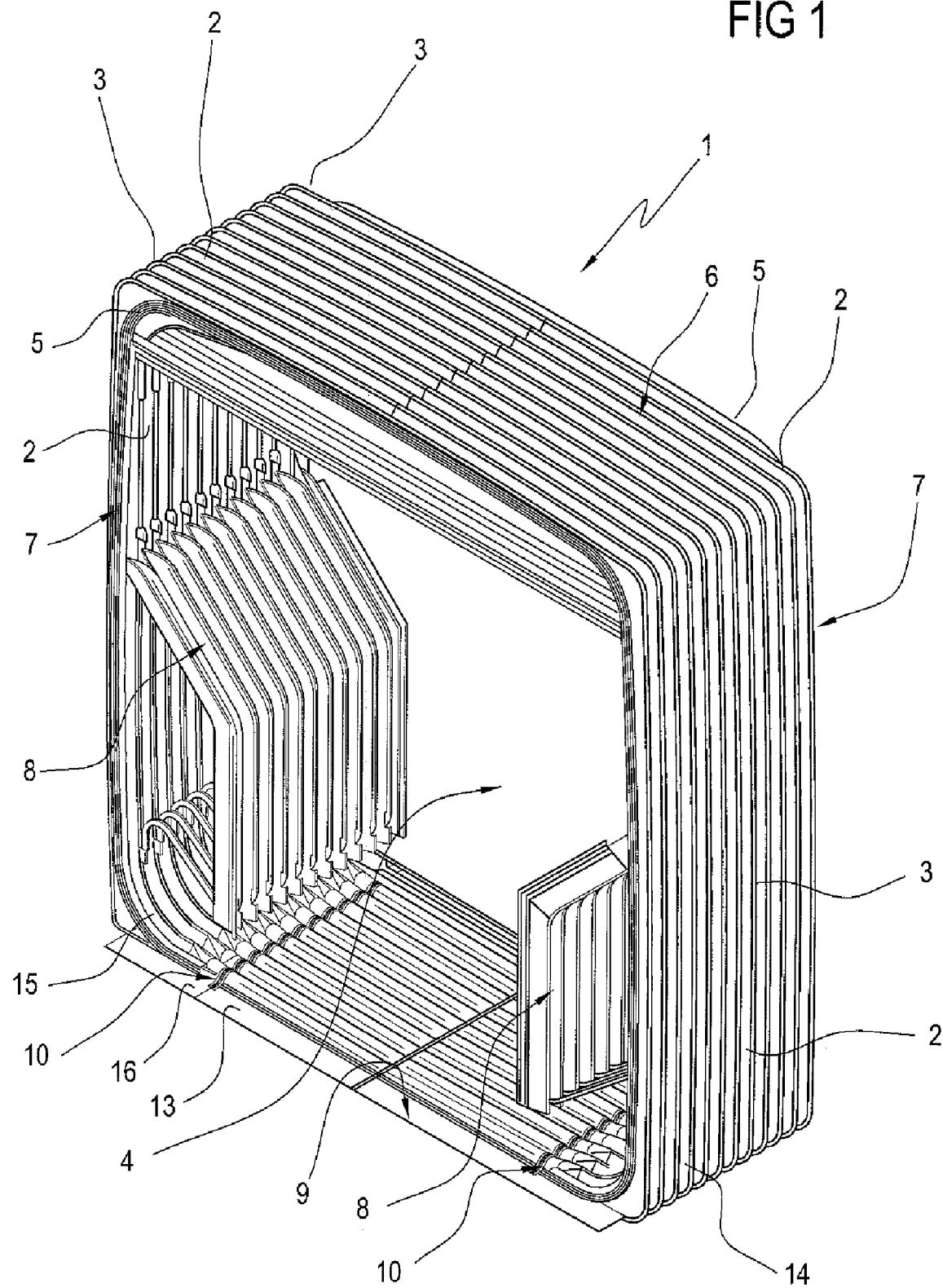
FIG. 1 is a perspective view of a gangway bellows cover-style connecting device for articulated vehicles according to the present invention.

With reference to the accompanying drawings, the numeral 1 denotes as a whole a gangway bellows cover-style connecting device for articulated vehicles according to the present invention.

The device 1 comprises a plurality of bands 2 made of flexible material and equipped with stiffening frames 3.

Preferably, the bands 2 are made of plasticized fabric and the stiffening frames 3 are made of aluminum or of rigid plastic material.

The bands 2 are connected to each other to form a connecting tunnel 4 between two coaches of a vehicle.

The bands 2 are preferably stitched together.

The stiffening frames have the dual purpose of protecting the stitching between the bands 2 and stiffening the tunnel 4 structure.

The tunnel 4 can be connected to the vehicle coaches by means of suitable end frames 5.

The tunnel 4 comprises an upper wall 6 and two lateral walls 7.

Extending from each of the lateral walls 7 there is a respective auxiliary wall 8 to which a rotary platform (not illustrated) can be connected. The rotary platform forms the treadable surface for vehicle passengers during transit between one coach and the next.

The auxiliary walls 8, together with the rotary platform, also divide the tunnel 4 into a main tunnel used for passenger transit and a secondary tunnel for the passage of pipes, ducts and cables for correct operation of both of the vehicle's coaches.

When installed in an articulated vehicle, the tunnel 4 deforms by shortening and lengthening depending on the relative position adopted on each occasion by the two coaches.

The device 1 also comprises a closing panel 9 connected to a lower portion 10 of the lateral walls 7 to form a lower wall of the tunnel 4.

The lower wall formed by the closing panel 9 is positioned below the rotary platform and closes the bottom portion of the tunnel 4, allowing the rotary platform to be protected from the weather, reducing the noise from the road surface which propagates in tunnel 4 and closing the bottom of the secondary tunnel, thus protecting the devices which pass through it.

Advantageously, the closing panel 9 is connected to the lateral walls 7 of the tunnel 4 by connecting means 10 acting on ends of respective free edges 13, 16 of the closing panel 9 and of the lateral walls 7 of the tunnel 4, in such a way that the closing panel 9 lies coplanar with the free edges 16 of the lateral walls 7 of the tunnel 4.

In other words, the connecting means 10 guarantee that the closing panel 9 does not even partly overlap the free edges of the lateral walls 7 of the tunnel 4.

In this way, the stresses generated while the vehicle is moving do not apply shearing actions along the connecting portion between the closing panel and the lateral walls (as occurs in the prior art), since the closing panel and the lateral walls of the tunnel do not have overlapping portions.

In the preferred embodiment of the invention (illustrated in FIGS. 1 to 3), the connecting means 10 are a zip fastener.

In this way, the closing panel 9 can easily and rapidly be removed to allow tunnel 4 inspection, for substitution and in any case whenever necessary.

The closing panel 9 preferably comprises a plurality of bands 11 connected to each other and made of flexible material as in the case of the tunnel 4 bands 2.

Figure 2:
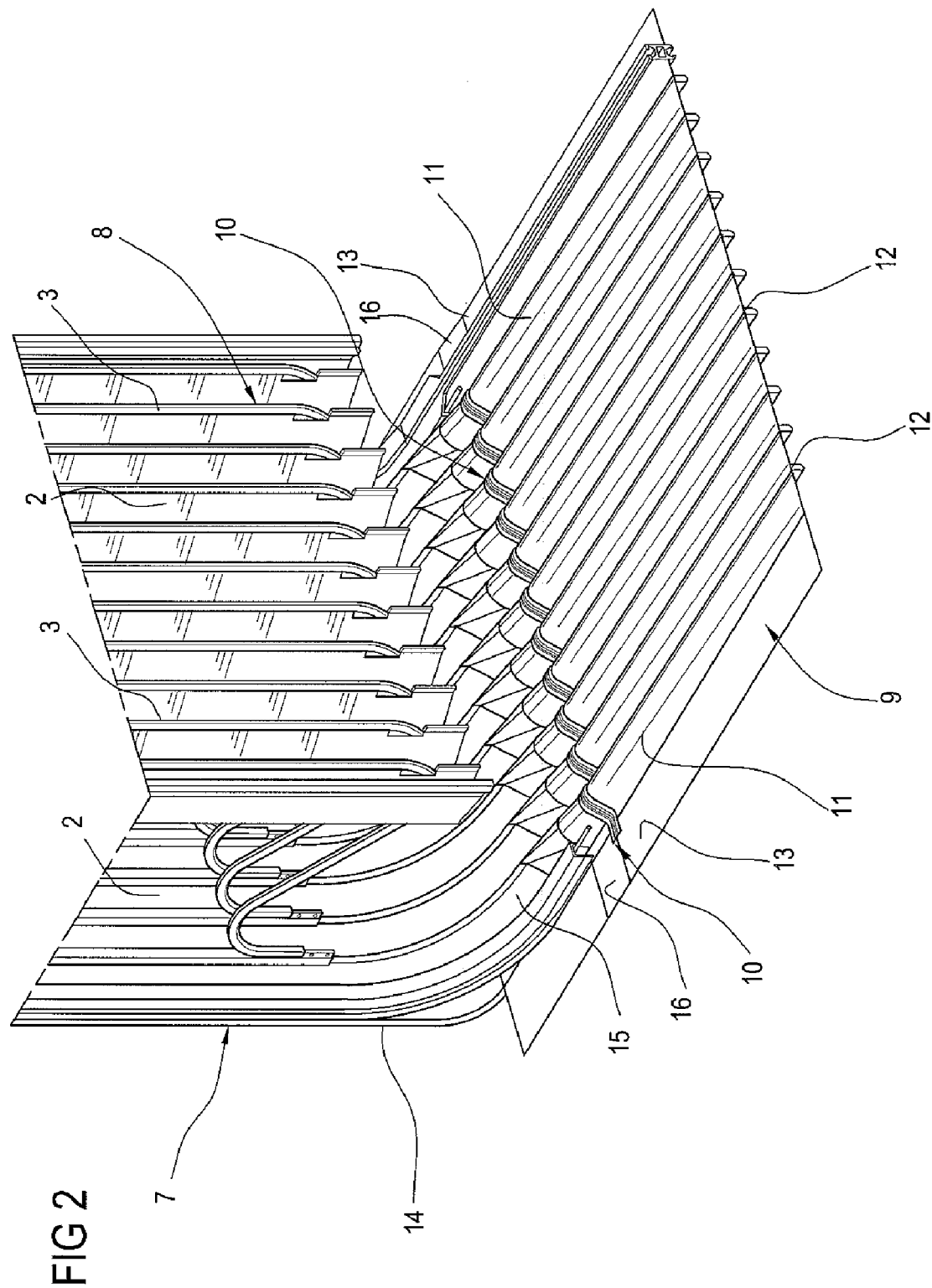
FIG. 2 is a perspective view of a detail of the device of FIG. 1.

The panel 9 bands 11 are equipped with stiffening elements 12 extending between the two opposite free edges 13 (of which only one is illustrated in FIG. 2) of the panel 9.

In this way, when the vehicle takes a bend and the tunnel 4 is compressed on the side facing the inside of the bend and extends on the side facing the outside of the bend, the closing panel 9 also substantially follows the same type of deformation.

As already indicated, the opposite free edges 13 (of which only one is illustrated in FIG. 2) are designed to be connected to the lateral walls 7 of the tunnel 4 and the zip fasteners 10 extend between the free edges 13 and the lateral walls 7 of the tunnel 4.

The free edges 16 of the lateral walls 7 are preferably positioned on end portions 14 of the lateral walls 7 of the tunnel 4.

In particular, the end portions 14 comprise a respective substantially horizontal projection 15 having the above-mentioned free edge 16 (FIG. 2).

The closing panel 9 is connected to the free edge 16 of the projections 15.

In this way, the closing panel 9 is coplanar with the substantially horizontal projections 15 and the panel bands 11 are substantially aligned with the bands 2 of the projections 15, as shown in FIG. 2.

It should also be noticed that the zip fasteners 10 follow the undulating profile of both the free edge 11 of the closing panel 9 and the free edge 16 of the projections 15.

That undulating profile is given by the "half-barrel" shape of the bands 2, 11 made of flexible material designed to allow them, and therefore also the tunnel 4 and the panel 9, to extend and shorten depending on the relative position of the vehicle coaches.

Figure 3:
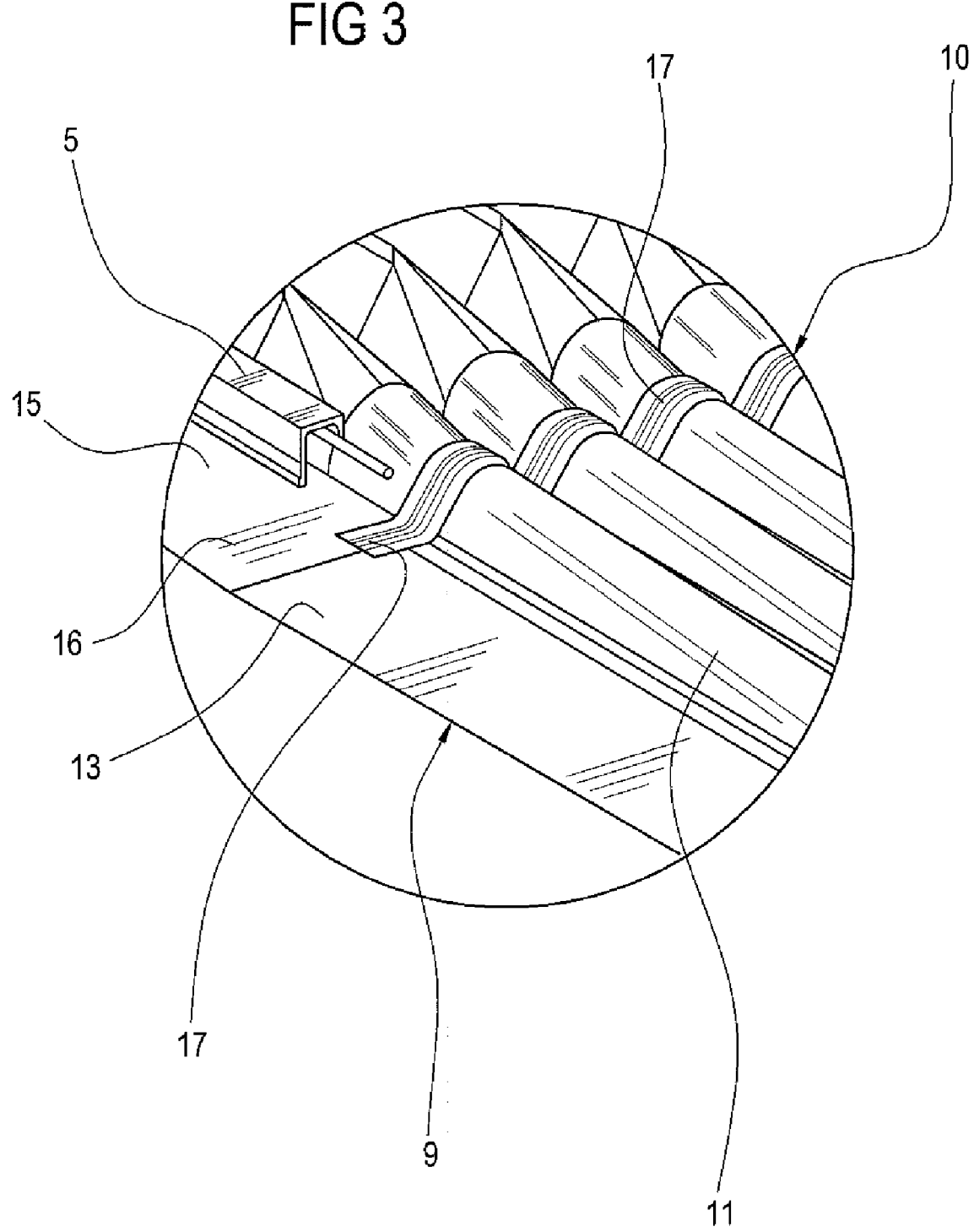
FIG. 3 is an enlarged view of a detail of FIG. 2.

As illustrated in FIG. 3, each zip fastener 10 preferably comprises two tapes 17 made of flexible material and having closing teeth.

When the zip fastener 10 is closed the teeth of one tape are inserted in the teeth of the other tape, stably connecting the two tapes to each other.

A first tape 17 is stably connected to the free edge 16 of a projection 15 of the lateral walls 7 of the tunnel 4 and a second tape 17 is stably connected to the closing panel 9.

The tapes 17 are preferably applied to the panel 9 and to the projections 15 by means of stitching.

In an alternative embodiment of the invention (illustrated in FIG. 4), the connecting means 10 are two semi-rigid profiles 20, 21 connected to each other by slotting together.

One of the two profiles 20 is on the free edge 16 of the lateral wall 7, whilst the other profile 21 is on the free edge 13 of the closing panel 9.

The two profiles 20, 21 are slotted together.

In particular, one of the two profiles comprises a substantially "C"-shaped cavity 22 designed to house a substantially dovetail-shaped protuberance 23 on the other profile.

The invention achieves the preset aim.

Thanks to the connecting means 10 acting on the ends of respective free edges 13, 16 of the closing panel 9 and of the lateral walls 7 of the tunnel 4, the closing panel 9 and the lateral walls 7 of the tunnel 4 do not even partly overlap, allowing a transfer of stresses from the tunnel 4 to the closing panel 9 and vice versa which does not apply shearing actions along the join between the two elements.

In particular, thanks to the zip fastener connecting the closing panel to the lower portion of the tunnel, only a minimal part of any mechanical stress to which the tunnel is subjected is transmitted to the closing panel, since the tapes of the zip fastener allow the tunnel to move (even if only to a limited extent) relative to the closing panel.

This feature allows detachment of the panel from the tunnel to be prevented when the latter is subjected to mechanical stresses while the vehicle is moving.

Moreover, even on a bend, that is to say, when one portion of the tunnel is compressed and the other extends, the flexibility of the zip fastener prevents different degrees of deformation between the tunnel and the closing panel from causing the latter to become detached.

What is claimed is:

1. A gangway bellows cover-style connecting device for articulated vehicles comprising:
a plurality of bands made of flexible material, and having stiffening frames, connected to each other and forming a tunnel which has an upper wall and two lateral walls for connecting two coaches of a vehicle to each other, each lateral wall including a lower end portion having a substantially horizontal projection, at least one of the horizontal projections having a free edge;
a closing panel having at least one free edge for connecting to the free edge of the at least one horizontal projection to form a lower wall of the tunnel;
a connecting mechanism for connecting the respective free edges of the closing panel and the at least one horizontal projection in a manner so that the respective free edges are coplanar with one another.

2. The device according to claim 1, wherein the connecting mechanism is a zip fastener.

3. The device according to claim 1, wherein the closing panel comprises a plurality of bands connected side by side to each other, the bands being made of flexible material and having stiffening elements extending substantially perpendicularly to the free edges.

4. The device according to claim 2, wherein the zip fastener comprises first and second tapes made of flexible material and having closing teeth; the first tape being stably connected to the free edge of the at least one horizontal projection and the second tape being stably connected to the free edge of the closing panel.

5. The device according to claim 3, wherein the bands of the closing panel are aligned with the bands of the lateral walls in both vertical and horizontal directions.

6. The device according to claim 1, and further comprising at least one auxiliary wall positioned inwardly from one of the lateral walls to form a protected secondary tunnel therebetween.

7. The device according to claim 1, wherein each of the horizontal projections has a free edge and the closing panel has two free edges on opposite ends for connecting to the respective free edges of the horizontal projections to form the lower wall of the tunnel, and further comprising a second connecting mechanism for connecting an opposite free edge of the closing panel with the free edge of the other of the horizontal projections so that the respective free edges are coplanar with one another.

8. A gangway bellows cover-style connecting device for articulated vehicles comprising:
a plurality of bands made of flexible material, and having reinforcing structure, connected to each other and forming a tunnel which has an upper wall and two lateral walls for connecting two coaches of a vehicle to each other, each lateral wall including a lower end portion having a substantially horizontal projection, at least one of the horizontal projections having a free edge;
a closing panel having at least one free edge for connecting to the free edge of the at least one horizontal projection to form a lower wall of the tunnel;
a zip fastener for connecting the respective free edges of the closing panel and the at least one horizontal projection in a manner so that the respective free edges are coplanar with one another.

9. The device according to claim 8, wherein the closing panel comprises a plurality of bands connected side by side to each other, the bands being made of flexible material and having stiffening elements extending substantially perpendicularly to the free edges.

10. The device according to claim 9, wherein the bands of the closing panel are aligned with the bands of the lateral walls in both vertical and horizontal directions.

11. The device according to claim 10, wherein the zip fastener comprises first and second tapes made of flexible material and having closing teeth; the first tape being stably connected to the free edge of the at least one horizontal projection and the second tape being stably connected to the free edge of the closing panel.

12. The device according to claim 11, and further comprising at least one auxiliary wall positioned inwardly from one of the lateral walls to form a protected secondary tunnel therebetween.

13. The device according to claim 12, wherein each of the horizontal projections has a free edge and the closing panel has two free edges on opposite ends for connecting to the respective free edges of the horizontal projections to form the lower wall of the tunnel, and further comprising a second zip fastener for connecting an opposite free edge of the closing panel with the free edge of the other of the horizontal projections so that the respective free edges are coplanar with one another.

14. The device according to claim 8, wherein each of the horizontal projections has a free edge and the closing panel has two free edges on opposite ends for connecting to the respective free edges of the horizontal projections to form the lower wall of the tunnel, and further comprising a second zip fastener for connecting an opposite free edge of the closing panel with the free edge of the other of the horizontal projections so that the respective free edges are coplanar with one another.

15. The device according to claim 8, wherein the zip fastener comprises first and second tapes made of flexible material and having closing teeth; the first tape being stably connected to the free edge of the at least one horizontal projection and the second tape being stably connected to the free edge of the closing panel.

16. The device according to claim 8, and further comprising at least one auxiliary wall positioned inwardly from one of the lateral walls to form a protected secondary tunnel therebetween.

17. The device according to claim 5, and further comprising at least one auxiliary wall positioned inwardly from one of the lateral walls to form a protected secondary tunnel therebetween.

18. The device according to claim 17, wherein each of the horizontal projections has a free edge and the closing panel has two free edges on opposite ends for connecting to the respective free edges of the horizontal projections to form the lower wall of the tunnel, and further comprising a second connecting mechanisms for connecting an opposite free edge of the closing panel with the free edge of the other of the horizontal projections so that the respective free edges are coplanar with one another.

* * * * *